Figures 1, 2:
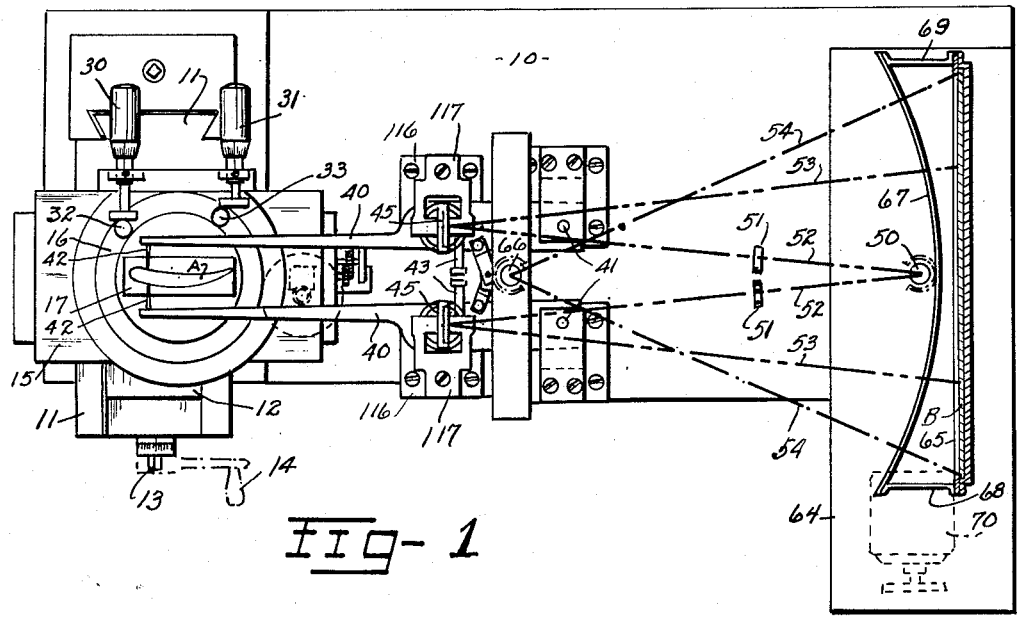

March 8, 1955 B. J. SMYTH 2,703,456
SYSTEM OF MAKING AND RECORDING PROFILE MEASUREMENTS
Filed April 13, 1948 7 Sheets-Sheet 1

INVENTOR
BERTRAM J. SMYTH, Deceased,
by RUTH B. SMYTH, Administratrix,
By
ATTORNEY March 8, 1955  B. J. SMYTH  2,703,456

SYSTEM OF MAKING AND RECORDING PROFILE MEASUREMENTS

Filed April 13, 1948  7 Sheets-Sheet 2

INVENTOR
BERTRAM J. SMYTH, Deceased,
by RUTH B. SMYTH, Administratrix
By
*G. A. Schmitt*
ATTORNEY March 8, 1955 B. J. SMYTH 2,703,456
SYSTEM OF MAKING AND RECORDING PROFILE MEASUREMENTS
Filed April 13, 1948 7 Sheets-Sheet 3

INVENTOR
BERTRAM J. SMYTH, Deceased,
by RUTH B. SMYTH, Administratrix
By
ATTORNEY

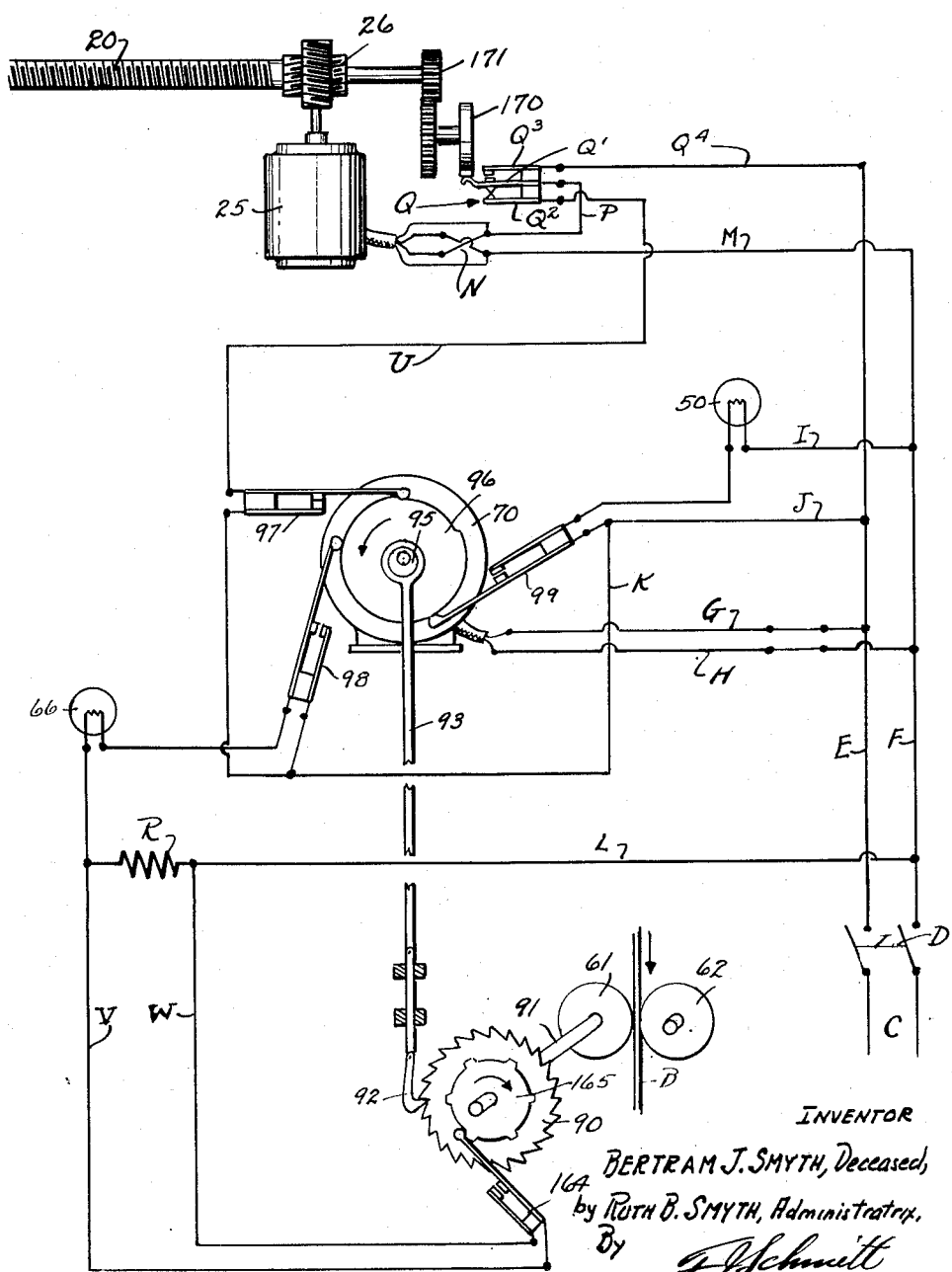

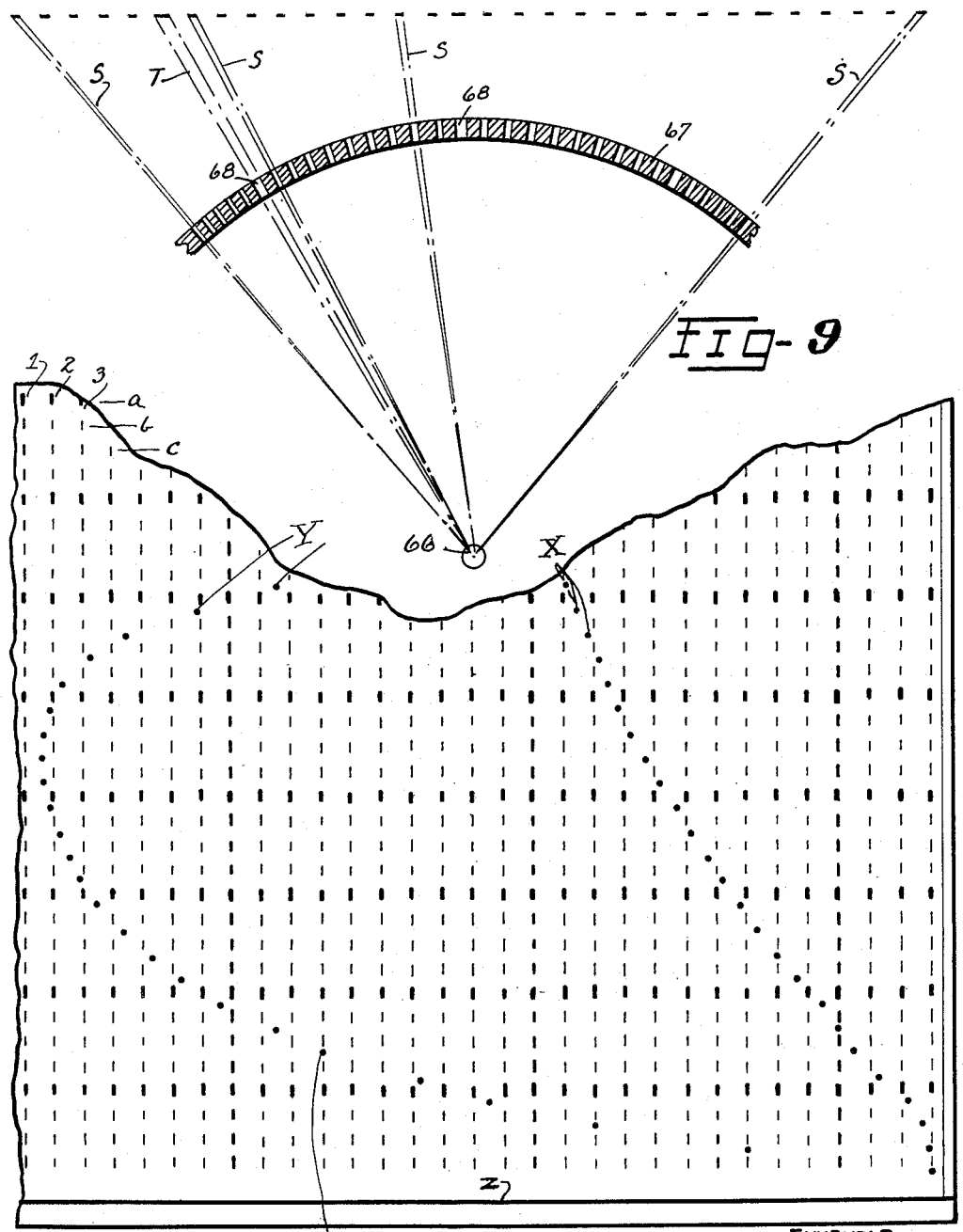

March 8, 1955 B. J. SMYTH 2,703,456
SYSTEM OF MAKING AND RECORDING PROFILE MEASUREMENTS
Filed April 13, 1948 7 Sheets-Sheet 6

INVENTOR
BERTRAM J. SMYTH, Deceased,
by RUTH B. SMYTH, Administratrix
By
ATTORNEY March 8, 1955  B. J. SMYTH  2,703,456
SYSTEM OF MAKING AND RECORDING PROFILE MEASUREMENTS
Filed April 13, 1948  7 Sheets-Sheet 7

INVENTOR
BERTRAM J. SMYTH, Deceased,
by RUTH B. SMYTH, Administratrix
By
F. J. Schmitt
ATTORNEY United States Patent Office 2,703,456
Patented Mar. 8, 1955

2,703,456

SYSTEM OF MAKING AND RECORDING PROFILE MEASUREMENTS

Bertram J. Smyth, deceased, late of Oberlin, Ohio, by Ruth B. Smyth, administratrix, Oberlin, Ohio, assignor, by mesne assignments, to Measuring Machines Inc., Cleveland, Ohio, a corporation of Ohio Application April 13, 1948, Serial No. 20,822

13 Claims. (Cl. 33—174)

(Granted under Title 35, U. S. Code (1952), sec. 266)

This invention relates to a system of making and recording profile measurements and includes the method of operation, the peculiar record produced thereby, and an efficient apparatus for carrying out the method. The measurements are made and recorded by the employment of a feeler to engage the surface of the article to be measured and a mirror operated in conformity to the movements of the feeler to direct a beam of light onto a photographic film. Such method and apparatus are particularly well adapted to make a magnified record of profiles of irregularly shaped objects so that very minute variations on the surface may be readily observed on the record chart produced.

One of the objects of the invention is to produce a visible scale photographically on a film during the succession of operations of recording the profile, so that there will be certainty of registration between the scale and the profile indication, and the produced sheet which will be independent of stretching or shrinking of the sensitized paper.

Another object is to produce a simultaneous measurement from opposite sides of the object to give the cross sectional dimensions thereof in successively inspected regions.

Still another object is to provide readily operable means for accurately positioning the article to be measured, so that movement thereof relative to the feelers may be along a line parallel with a chord of a curved article, so that the recorded measurement may be accurate from a datum line on the photographic sheet.

In the system of this invention, means are provided for advancing the film and simultaneously moving the article to be measured, and automatically controlled switches are provided for sources of illumination so that scale may be formed on the film by marks of readily recognizable character and the measurement may be superimposed in the scale spaces by marks of a different character. Preferably the photographic formation of the scale is made while the film is moving, thus producing elongated marks, while the photographing of the article measurement is made when the film is stationary, so as to produce dots or similarly small indications which in association with the scale produce a final record chart giving the exact measurements of the region measured.

The invention includes also an apparatus for effectively carrying out the above objects as illustrated in the drawings hereof and hereinafter more fully described. This apparatus operates on the general principle of turning a mirror on an axis by the shifting of a feeler engaging the article to be measured, such mirror serving to direct illumination to a photographic film to make chemical changes therein which when the film is developed will produce marks on the film. Another source of illumination, acting through a grid, photographically produces a dimensional scale on the film, alternately with the photographing of the measurement of the article, so that the marks on the film, respectively of the scale and the measurements, are properly correlated.

The apparatus in its preferred form tests opposite points on the article and produces on the film indications which will show in magnified form the cross sectional distance across the article in the region measured.

All of the above operations and features will be clear from the following description of preferred embodiments illustrated in the drawings.

Figure 3:
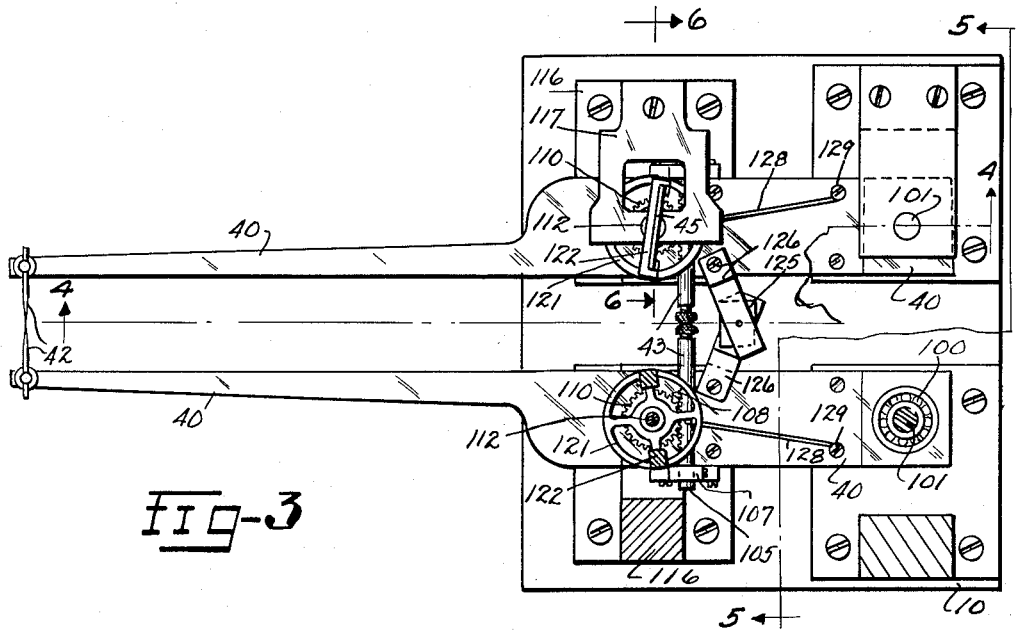
Figure 4:
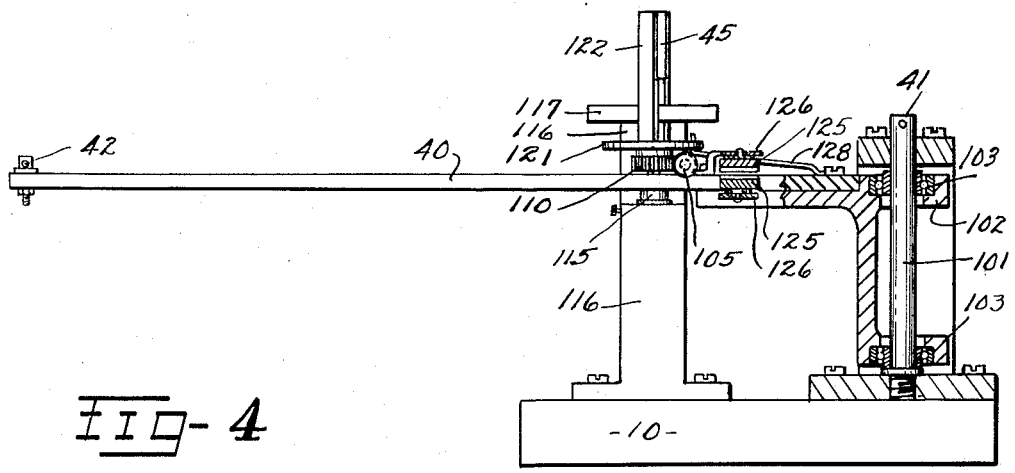
Figure 5:
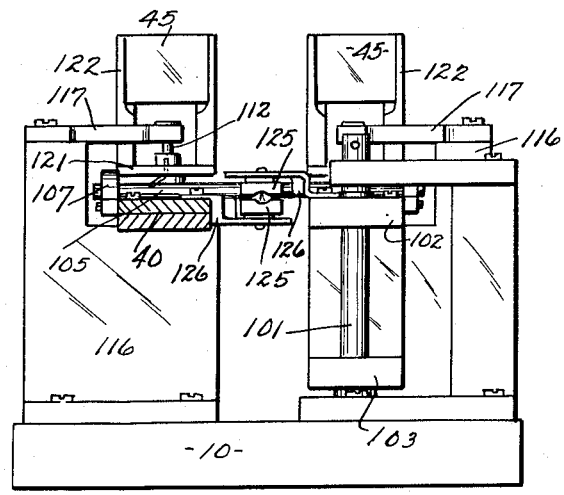
Figure 6:
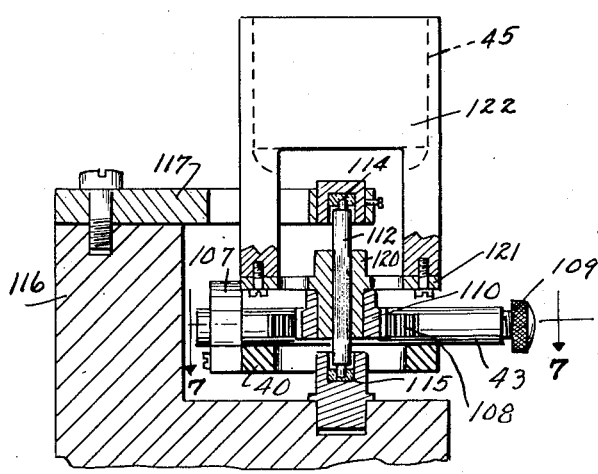
Figure 7:
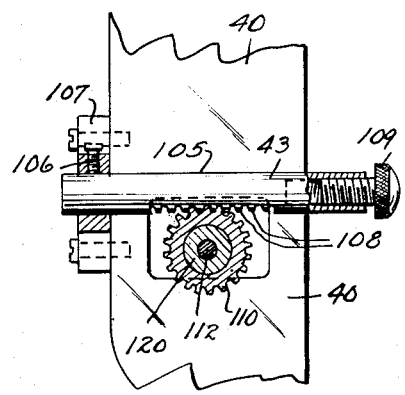
Figures 11, 12:
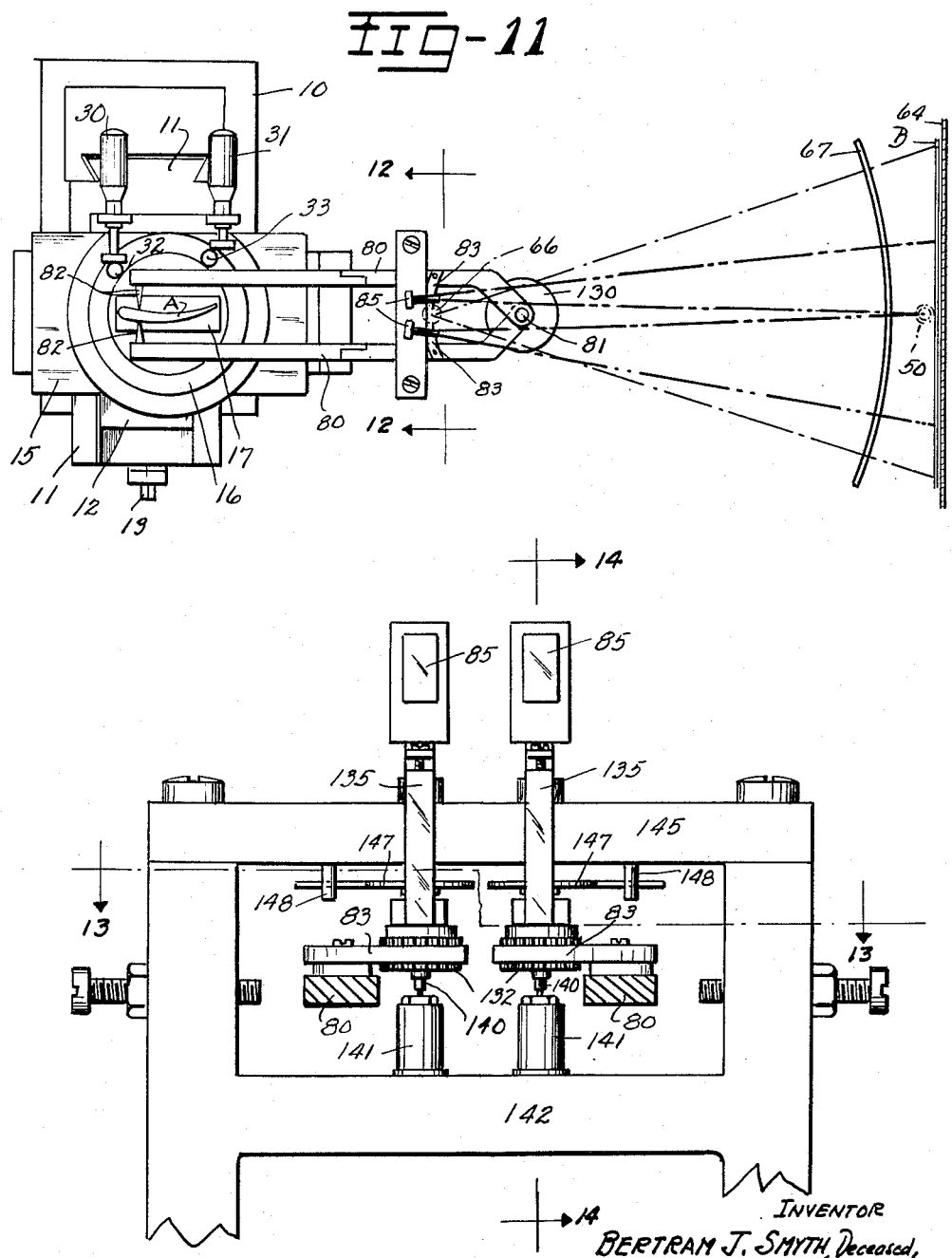
Figure 13:
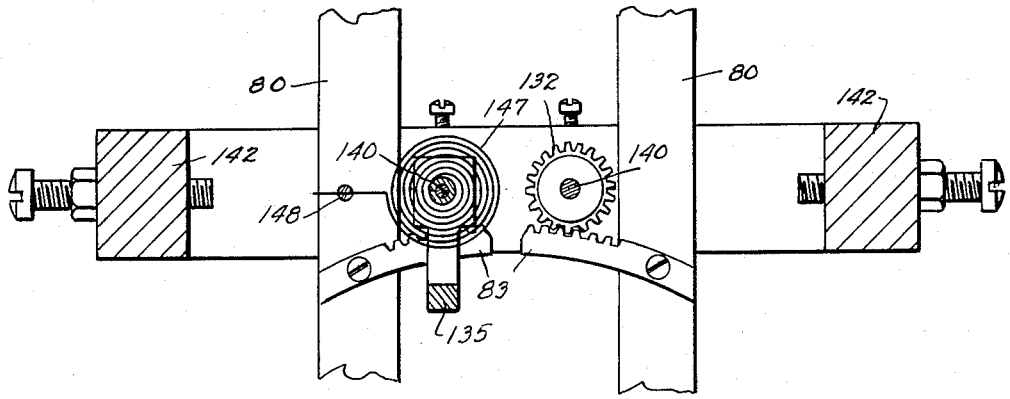
Figure 14:
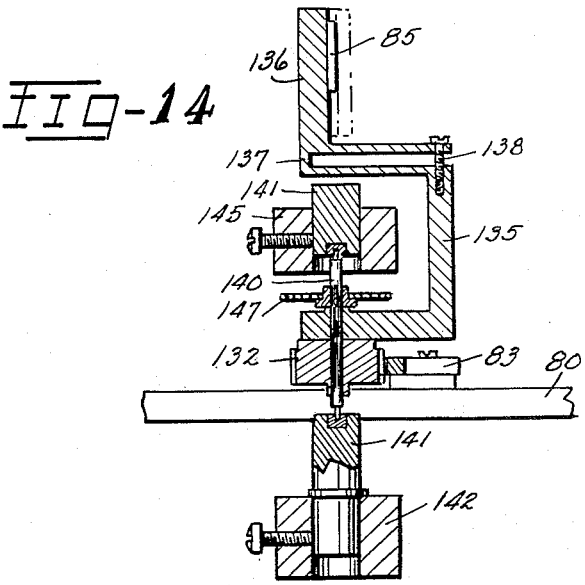
Figure 15:
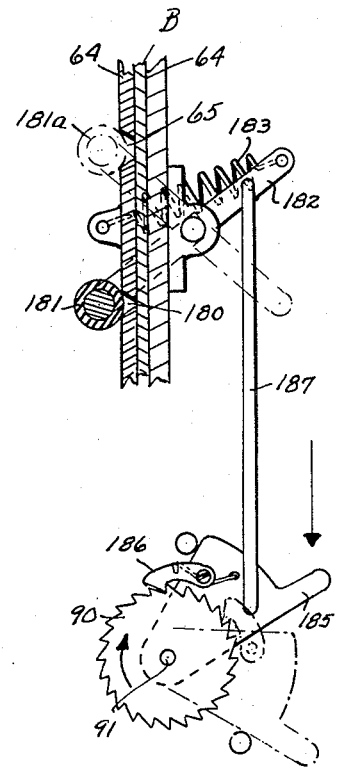

In the drawings, Fig. 1 is a plan partly in section of one embodiment of the apparatus of this invention; Fig. 2 is a sectional side elevation of the same; Fig. 3 is an enlarged view of the mirror operating mechanism of Fig. 1; Fig. 4 is a vertical section of such mechanism in offset planes, as indicated by the line 4—4 on Fig. 3; Fig. 5 is a transverse section in offset planes indicated by the line 5—5 on Fig. 3; Fig. 6 is a detail of the mirror turning mechanism, in a plane indicated by line 6—6 on Fig. 3 but on a larger scale; Fig. 7 is a horizontal section on a line 7—7 in Fig. 6; Fig. 8 is a diagram illustrating the operation of the article movement, the film feed, and the actuation of various switches all controlled by a master motor; Fig. 9 is an enlarged horizontal section through the scale forming grid shown in Figs. 1 and 2; Fig. 10 is a face view of a portion of the record chart produced by the apparatus; Fig. 11 is a plan of modification of the article measuring and mirror portion of the apparatus; Fig. 12 is an enlarged vertical section of such modification in a plane indicated by the line 12—12 on Fig. 11; Fig. 13 is a horizontal section through such modification in offset planes indicated by the lines 13—13 in Fig. 12; Fig. 14 is a vertical section through this modification, as indicated by the line 14—14 on Fig. 12; Fig. 15 is a view in vertical section illustrating means for enabling the photographic formation of a datum line on the chart.

Referring first to Figs. 1 and 2, 10 indicates a suitable base on which a vertically adjustable block 11 carrying a slide 12 adjustable from front to back of the machine. Any suitable means may be employed for manually adjusting the supporting block and transverse slide. Fig. 2 indicates, for instance, a screw 13 rotatably mounted in the block 11 and threaded in the slide and adapted to be operated by a crank 14 (Fig. 1). Similar means (not shown) may be used for raising and lowering the block.

Mounted on the transversely movable slide 12 is a longitudinally movable slide 15 and mounted on this slide is a turntable 16 equipped with suitable clamp or holding device 17 for holding the article to be measured. Such article in these figures is indicated as an impeller blade A.

The vertical adjustment of the supporting block, and the horizontal adjustment of the lateral slide, and the rotative adjustment of the turntable are all performed manually and the parts become locked in position when set. The longitudinal slide 15, on the other hand, is moved during the operation of the apparatus. To provide for such movement, Fig. 2 shows a screw 20 journaled in the transverse slide 12 and threaded in an ear 21 depending from the longitudinal slide. 25 indicates an operating motor for the longitudinal slide, the armature shaft being indicated as connected by spiral gearing 26 to the screw 20. The time of operation of this motor with reference to the rest of the apparatus will be hereinafter described.

By adjusting the table 16 about its axis one is able to position the article to be tested so that its movement by the longitudinal slide will be parallel with a tangent to one side of the article. The article to be measured, as for instance, a turbine blade, is shown at A. When this has been clamped to the table, the table is adjusted about its axis by a pair of micrometer screws 30 and 31 which abut upstanding pins 32 and 33 rigid with the table. The adjustment of these screws accurately positions the table and holds it when set.

The mechanism which turns the mirrors in accordance with the profiles of the article is shown in one form in Figs. 1 to 6 and in another form in Figs. 11 to 14. Each of these embodiments has a pair of longitudinally extending arms 40, in Fig. 1, or 80, in Fig. 11, suitably pivoted by individual pivots 41, in Fig. 1, or by a common pivot 81 for both arms in Fig. 11. In either case each feeler arm carries a feeler point 42 or 82 to engage opposite sides of the article and each arm carries a rack 43, in Fig. 1, or 83 in Fig. 11, to engage a pinion for turning a mirror as 45, in Fig. 1, or 85, in Fig. 11. The specific constructions illustrated in these two embodiments will be hereinafter described in detail.

50 in various figures designates a source of light, the rays 52 of which passing through a focusing lens 51, act on the mirrors 45 or 85 to direct a beam 53 through a horizontal slit in the housing containing a photographic film, to cause indications thereon corresponding to the position of the feeler engaging the article, though greatly magnified as to actual distance.

60 in Figs. 1 and 2 indicates a roll of film B, as sensitized paper. Such paper is caused to travel in a plane from this roll with the sensitized side toward the measuring apparatus. To progress the film a pair of rolls 61 and 62 are provided, the former of which is rotated by suitable mechanism actuated by a motor 70. This motor may operate continuously and be connected periodically, by suitable intermediate mechanism, as hereinafter described, to operate the film advancing roll 61.

A suitable housing indicated at 64 encloses the film and the driving rollers therefor. The lamp 50 is outside of this housing and its reflected beams enters through a narrow horizontally extending slit 65 to effect the photographic impression on the film behind the slit.

66 designates a second source of light adapted to direct a beam 54 through the same slit 65. Interposed between this light and the slit is a grid or a comb 67 stationarily carried, as by brackets 68 from the housing 64, this comb extending transversely of the direction of movement of the film. The comb is preferably curved concentrically about the source of light 66.

In the operation of the apparatus, after the object has been clamped and accurately located in position, the film driving connection is started in movement to progress the film, and the lamp 66 is lighted with the result that its rays passing through the comb and the slit 65 make a transverse row of photographic indications on the film, and as the film is progressing a short distance during this illumination these indications are in the form of short lines or dashes. As the illumination is intermittent, there are produced on the film, at each cycle of operation, a series of these lines in a transversely extending row, adjacent rows being separated by a transverse blank space.

More specifically stated, if the film is progressing vertically, as indicated in Fig. 2, the short lines extend vertically and are spaced apart horizontally by the action of the comb and vertically by blank distances resulting from extinguishment of the illumination between successive cycles. Each row of vertical dashes or pickets thus formed extends horizontally across the film. The result is the formation on the film, after successive operations (after the film has been developed) of a succession of vertically spaced horizontal rows of visible marks, the marks in each row being vertical pickets or dashes and such pickets or dashes being in alignment in vertical rows.

The above result is indicated in Fig. 9, wherein 1, 2, 3, etc. indicate the vertical rows of individual dashes made by the light while the paper is moving, the corresponding dashes in successive vertical rows aligning and forming horizontal rows, indicated by a, b, c, etc.

Now with this apparatus, one can form, on the same film and during the same operation with the production of the scale, a series of dots corresponding to the position indicated by the two pointers 42. These dots are made by the light from the source 50 reflected by the mirrors 45 directly through the slit 65 while the film is stationary. Fig. 9 shows a course X of such dots indicating one face of the object measured and a course Y indicating the opposite face.

In other words, at a proper time while the film is stationary the light 50 is illuminated and its beam is reflected by the two mirrors 45 in a course out of range of the comb 67, but passing through the same slit 65 in widely different positions, as indicated by the two reflection lines 55 in Fig. 1. As this photographic indication is made at the time the film is stationary between two dash-forming advancements thereof, there results a series of dots located in the spaces between successive rows of dashes, one series of these dots (X, for example) indicating the conditions on one side of the object A, the other series Y, indicating conditions on the opposite side.

After the sheet has been developed these dots may be readily connected manually by a line to give a greatly magnified curve corresponding to the profile of the article. The distance between any two corresponding dots (measured parallel with the adjacent row of dashes) corresponds to the cross sectional distance across the article at the corresponding location. As the carriage is moved simultaneously with the movement of the paper, each succeeding dot photographed onto the paper when it is stationary comes on a different place on the photographic sheet and represents the new location on the article.

As the length of the dashes depends upon the length of time the film is advancing, and as during this time the carriage is moving a definite distance, it follows that each successive horizontal row of dashes corresponds in the apparatus shown to a different region of the feeler engagement with the article, and as the film is advanced at a faster rate of speed than the article, relatively small movements of the article may be readily visible on the film. Furthermore, as the magnification is very great a very small change in the shifting of the measuring points results in a much greater horizontal positioning of the dots between the rows of dashes. Accordingly, though the difference in successive measurements of the article may be only a few thousandths of an inch, such difference is readily visible on the chart.

Likewise, by counting the number of dashes between corresponding point marks on the chart, for opposite sides of the article, one may readily obtain the actual distance across an article at that region. For example, if the distance from the center of one dash to the center of the next in a horizontal row is .10 of an inch, then if there are fifteen dashes with their spaces between the two dots of a pair we know the actual cross sectional distance is 1.50 inches. The horizontal distance between the dashes of a given row is determined by the spacing of the comb and is fixed at any convenient amount.

A close inspection of Fig. 10 will show that in each vertical course of dashes every fourth dash is made heavier. This is for the purpose of enabling the ready counting of the number of dashes. It is effected by relatively intensifying the light from the source 66 for every fourth operation, such intensification being effected by cutting out resistance in the lamp circuit from its normal condition for the other horizontal rows of dashes.

It will likewise be seen in Fig. 10 that every tenth vertical row of dashes is emphasized by being made heavier. This aids in counting the distance transversely of the chart. It is effected by making every tenth opening in the grid 67 wider than the normal openings, as indicated for example by the special openings 68. The rays of light through the normal spacing in Fig. 10 producing the normal width of dash, is indicated by S, Fig. 10, whereas the specially wide formation to give the heavier dash, is indicated by the more divergent rays T in this figure.

It is desirable to print on the chart, Fig. 10, a datum line Z spaced a proper distance from the dashes so that measurement on the chart may be made if desired from such datum line. To effect the printing of this line there is provided in the film housing 64 a special slit 180 located at the proper distance from the slit 65 through which the normal exposures are made. This slit 180 is normally closed by a gate in the form of a roller 181 carried by a pair of pivoted end arms 182 which are drawn in the closing direction by a spring 183. Ordinarily, therefore, the slit 180 is idle. When, however, it is desired to print on the film a straight horizontal datum line this is done by merely swinging the frame 182 to carry the gate 181 from the position shown in full lines in Fig. 15 to the dotted position 181a where it operates to close the opening 65. In this position ordinary daylight admitted through the opening 180 will act on the film to produce the datum line Z.

It is preferable to correlate the movement of the roller 181 with the feeding of the film so that a fresh portion of the film may be drawn opposite the opening 180 whenever the latter is exposed. This may be readily effected, as indicated in Fig. 15, by providing a manually operable arm 185 pivoted coaxially with the film feeding ratchet 90 and carrying a pawl 186 adapted to engage such ratchet. This hand lever 185 is connected by a link 187 to the gate carrying frame 182. Accordingly, when the hand lever 185 is shoved downwardly from its full line position in Fig. 15, to its dotted line position in that figure, it operates to advance the film and simultaneously shifts the normally closed gate 181 to its upper position to open the printing slot 180. This enables daylight passing through such slot to print the datum line on the sheet photographically.

I have referred to illumination from the source 66 passing through the comb 67 and entering this same slit 65 in the film housing. The comb, as shown in Fig. 2, is carried by suitable brackets 69 extending from the film housing. The comb is preferably arcuate in form, as shown in Figs. 1 and 11. To make the illuminations of the planular film equidistant, though coming through arcuately positioned slits of the comb, the comb spaces (with the exception of certain extra wide spaces hereinafter described) are gradually reduced in size from the central region in each direction, so that rays of light, as indicated at S in several positions in Fig. 9 effect the same spacing on the photographic film, as if the comb were a straight member with slots through it at differentially arranged angles in the direction of the beam to pass through the slot. It has been found simpler, however, to provide a comb concentric about the lamp and arrange the slots in the radial direction though of varying width, as stated. The master motor 70 is positioned at any suitable point in the apparatus and operates to control the advancement of the film and also to initiate the actuation of the motor 25 which moves the slide 15.

The actuation of the film may be readily effected by a ratchet wheel 90, Fig. 8, on a shaft 91 which carries one of the wheels 61 which in coaction with the opposite wheel 62 engages the film B. The ratchet wheel is shown as actuated by a pawl 92 on a sliding link 93 which carries a concentric strap surrounding an eccentric 95 on the armature shaft of the motor 70. With this eccentric connection and the motor 70 continuously running, then the downstroke of the vertical link 93 is idle for a half rotation of the motor, but during the other half operates to turn the ratchet 91 one tooth to turn the wheel 61 to feed the film. The actual timing will be explained hereinafter.

This same master motor 70 carries a cam 96 which operates various switches indicated in Fig. 8, namely, the switch 97 to control the starting of the motor 25; the switch 98 to control the scale light 66; the switch 99 to control the plotting light 50.

It is convenient to have the motor 70 continuously running and periodically operating the film feed as well as operating a cam which successively causes the electric connections to effect different operations. The order of the operations effected by the master motor 70 is as follows:

1st. Closes the starting circuit to the carriage motor 25.
2nd. Energizes the film drive.
3rd. Closes the circuit to the scale lamp 66.
4th. Opens the starting switch for the carriage motor.
5th. Opens scale lamp circuit.
6th. Closes the circuit to the plotting lamp 50.
7th. Opens the circuit to the plotting lamp.

The film feed on every fourth stroke cuts out a resistance R in the circuit of the scale lamp to make a heavier impression.

The operations of starting the carriage motor and starting the paper may take place simultaneously, and likewise the stopping of the carriage motor and the opening of the scale lamp circuits. The scale lamp is on for a sufficient length of time to produce the desired dash on the sheet, depending on the speed of the motor advancing the film. The plotting light operating while the film and object are stationary need be on only long enough to make a proper photographic exposure.

Fig. 8 indicates by way of example a wiring diagram indicating electric connections to the two motors 70 and 25 and the two lamps 50 and 66 to effect the operations heretofore stated.

In the wiring diagram, Fig. 8, the current is presumed to come from one of the two lines C, past a main controlling switch D to and from the lines E and F. From the lines E and F, lines G and H lead to the master motor 70. Likewise from these lines E and F, lines I and J lead through the plotting light 50 and its controlling switch 99. A line K is shown leading from the line I through the scale light switch 98 to the scale light 66 and then normally through a resistance R to the line L and thence to the line F. From the line F, a line M leads through a reversing switch N to the motor 25 and thence via the line P through a common contact $Q^1$ of a make-before-break switch Q, thence through one $Q^2$ of this switch through the line U, to the initiator switch 97 and from this switch through the lines K to the power line E. Shortly after the motor 25 is energized the cam 170 operates the switch Q to establish a circuit from the motor 25 through the line P, the common contact $Q^1$ and the other side $Q^3$ of the switch Q, a line $Q^4$ directly to the power line E, and immediately thereafter to break the circuit between the motor 25 which was established by closing of the initiator switch 97.

The advancement of the carriage is ordinarily for a very short distance, as it may be desired to take measurements as often, for example, as every .025 inch. Accordingly, the stopping of motor 25 is controlled by the opening of the switch Q by the cam 170, which is rotated by the work advancing screw 20. This cam opens the direct circuit between the motor 25 and the power line E, and reestablishes the circuit between such motor and the power line through the initiator switch 97 which was opened by the main control cam 95 long prior to the reestablishment of the circuit through it to the motor 25. The switch Q, therefore, acts as a limit switch and controls the distance travelled by the carriage during each cycle of operation.

Lines V and W lead from opposite sides of the resistance R to a special switch R which is adapted to be closed by a cam 165. The cam has one-fourth as many humps as there are teeth on the ratchet 90, so that every fourth stroke of the feeding ratchet will be accompanied by a short circuiting of the resistance in the scale light circuit, thus giving more intensive illumination and producing the heavy marks of dashes throughout every fourth horizontal row, as shown in Fig. 10.

The first operation of the cam 95 is to close the switch 97 and pass current to the motor 25 via the lines E, I, K and U to the closed switch Q to the line P and through the set reversing switch N to the motor and back via the line M to the line F. This starts the motor 25 rotating, and rotates the feed screw 20 which advances the carriage and hence the article to be measured.

During the advancement of the work, under the control of the switch 97, the cam 95 operates to close the switch 98 energizing the scale light 66 either through the resistance R or through its by-pass according to the position of the cam 165. While the scale light is on, the pawl mechanism driven by the motor 70 operates the ratchet 90 to advance the film, such advancement continuing after the cam 95 opens the switch 98. This results in producing one row of dashes horizontally across the chart and producing a horizontal blank space immediately following the row.

The next operation of the cam 95 takes place after the cam 170 has operated to open the limit switch to the motor 25 and during the idle stroke of the pawl 92. The result is both the article being measured and the film are stationary at the time the cam acts on the switch 99 to close the circuit through the plotting light 50. This results in the direction of beams of light from the two mirrors 45 through the slit 65 to produce two dots on the film corresponding to positions of the needle points 42 on opposite sides of the article being measured.

It will be seen that with this mechanism there is produced not only a scale chart but during the same operation two series of dots, as the series X on Fig. 10 indicating one surface of the article being measured, and the series Y indicating the opposite surface, and the number of dashes in any horizontal row between the two lines made by these two courses of dots indicates the exact cross sectional dimension of the article in the region being measured. Successive measurements being taken at equally spaced positions on the article, two lines, which may be subsequently drawn on the chart, connecting the two courses of dots accurately portray in greatly magnified form not only the surface conditions of the article by the cross sectional dimensional at all measured regions thereof.

Reverting now to the first embodiment of the mirror actuating mechanism shown in detail in Figs. 3 to 7 inclusive, the two arms 40 are shown as pivoted by ball bearings 100 on two vertical studs 101 carried by the frame 10 of the apparatus. Each arm 40 is preferably bifurcated to provide spaced ears 102 and 103, Fig. 4, carrying the respective ball bearings about the supporting stud. The racks 43 in this embodiment comprise straight bars 105 adjustably secured at 106 to blocks 107 on each of the arms 40. Vertical teeth 108 on each rack 43 mesh with pinions 110 which connect with the mirrors 45.

As shown, the pinions 110 are rigidly mounted on a sleeve which in turn is rigidly secured to a vertically extending shaft 112. The lower ends of the shafts 112 are journaled in jeweled bearings 115 carried by upstanding brackets 116 supported by the base 10, and the upper ends of these shafts are journaled in similar jeweled bearings 114 carried by plates 117 carried by the brackets 116 rigidly mounted or formed integral with the base 10. Sleeves 120 are fixedly mounted on the shafts 112, and formed integral with the sleeves 120 are discs 121. Secured to diametrically opposite regions of each of these discs is an upstanding bifurcated plate 122 on which the respective mirrors 45 are mounted.

A screw 109 having a knurled head is threaded in the inner end of each rack, and these two screws by abutting each other form proper stops limiting the inward movement of the arms when the feeler points 42 are just about to touch, as shown in Fig. 3.

Means are provided to give the arms a tendency to move toward each other to the limit. The means shown in Figs. 3 to 5 comprise a pair of permanent magnets 125 secured to short arms 126 projecting inwardly from the respective arms 40. These magnets overlap each other with opposite poles adjacent so that they tend to draw the arms 40 together.

To prevent any backlash in the gearing from the rack bars 43 to the pinions 110, a pair of springs 128 are provided which are secured at one end 129 to the respective arm, the spring being constrained laterally to act on the rotating disc 121 which carries the pinion meshing with the gear. By this means the pinion teeth are always maintained tight against the rack teeth in the direction toward the space between the arms and any looseness in the gearing is avoided.

It will be understood from the above specific description that a very accurate mechanism has been provided for converting the movement of the feeler point 42 into a movement of the mirror 45.

In place of the specific mechanism just described, one may employ the mechanism of Figs. 11 to 14. In that case the two arms 80 are shown as pivoted at 81 on a single pivot carried by a post 130 rising from the base. Each arm 80 carries an arcuate rack 83 which engages a pinion 132 rigidly connected to the mirror carrier.

The mirror carrier in this instance is an offset bracket 135 having an upwardly extending wing 136 on which the mirror is mounted. The mirror may be slightly tipped one way or the other by reason of a spring portion 137 of this bracket adjusted by a screw 138, Fig. 14. The pinion with its bracket is rigid on a vertical shaft 140 which is mounted in jeweled bearings at the lower end in a stud 141 mounted in a suitable frame support 142, while at the upper end a jewel bearing is carried by a cross bar 145 secured to upright portions of the frame bracket 142.

Surrounding each pinion shaft 140 is a hair spring 147, connected at one end to the shaft and at the other to a stud 148 depending from the frame bar 145. These hair springs take up any backlash in the gearing between the racks 131 and the pinions 132, and tend to swing the arms 80 to retain the feeler points 82 in contact with the work piece A.

The mechanism just described, it will be seen, provides for accurately turning the mirrors in correspondence with the movement of the feeler points, and this mechanism may be employed in place of that shown in Figs. 3 to 6, if desired. In either case the operation is to reflect the beam of light from the source of illumination 50 through the slit 65 in the film housing.

The invention described herein may be manufactured and used by or for the Government of the United States of America for governmental purposes without the payment of any royalties thereon or therefor.

What is claimed is:

1. An apparatus for making a photographic chart indicating profile measurement of an article, comprising a housing adapted to contain a sensitized film, a feeler adapted to engage the article to be measured, a mirror, mechanism operated by the feeler for swinging it in accordance with the movement of the feeler, a source of light adapted to be reflected by the mirror through a slit in the housing onto the film, means for directing separated rays of light onto the film to produce a scale, means for alternately interrupting the light reflected by the mirror and the light from said separated rays, and means for progressing the film while the scale-producing light is effective and means for holding the film stationary while the light reflected by the mirror is effective.

2. A contour recorder comprising in combination, a specimen supporting carriage slidably mounted, a pivoted tracer arm having a stylus adapted to follow the surface of a specimen carried by said carriage, a pivoted mirror adapted to deflect according to movement of said arm, a source of light directed upon said mirror for reflecting a beam of such light, a light-sensitive film in the path of the reflected beam with means for moving said film in accordance with movement of said supporting carriage, a separate light source, a stationary scale-forming grid interposed between said separate light source and said film for casting shadows on the film at points representing predetermined scale divisions, and switch means for energizing said light sources alternately as the carriage is moved.

3. In a measuring apparatus, the combination of a movable slide, means for holding thereon an article to be measured, a pair of pivoted arms having feelers engaging respectively opposite faces of the article, a pair of mirrors pivotally mounted and geared with the arms, whereby the mirrors are turned in accordance with the movement of the feelers, a housing adapted to contain a sensitized film, a source of illumination providing rays of light adapted to be directed by the mirrors through the housing onto the film, a second source of illumination, a grid between said second source and the film adapted to produce spaced marks on the film, a master motor, a switch mechanism controlled thereby adapted in successive order to initiate the movement of the slide-advancing motor to illuminate the scale light, to advance the film while the scale light is illuminated, thereafter to extinguish the scale light and thereafter to turn on the light reflected by the mirrors onto vacant spaces on the film.

4. A continuous system for making and recording profile measurements, comprising mounting an object to be measured for movement in a straight line, continuously contacting the object to be measured with a follower, intermittently moving a light sensitive surface transversely past an opening in a housing enclosing the light sensitive surface, periodically exposing the light sensitive surface to a source of light transmitted through a shield while the light sensitive surface is moving to imprint a scale upon the light sensitive surface, alternately exposing the light sensitive surface to a second light source while the light sensitive surface is stationary and directing the light from said second source to the surface along a path varied in response to variations in the position of the follower, whereby a record of successive profile measurements and the scale by which they are to be measured are imprinted simultaneously in a single continuous operation.

5. A continuous system of making and recording profile measurements, comprising mounting an object to be measured for movement in a straight line and in a direction normal to a planar light sensitive surface, continuously contacting the object to be measured with a follower, intermittently moving the light sensitive surface transversely within the plane in which it lies, periodically exposing the light sensitive surface to a source of light transmitted through a shield while the light sensitive surface is moving to imprint a scale upon the light sensitive surface, alternately exposing the light sensitive surface to a second light source while the light sensitive surface is stationary and directing the light from said second source to the surface along a path varied in response to variations in the position of the follower, whereby a record of successive profile measurements and the scale by which they are to be measured are imprinted simultaneously in a single continuous operation.

6. A continuous system for making and recording profile measurements, comprising mounting an object to be measured for movement in a straight line and in a direction normal to a planar light sensitive surface, continuously contacting the object to be measured with a follower, intermittently moving the light surface transversely within the plane in which it lies and simultaneously moving the object transversely relative to the follower, periodically exposing the light sensitive surface to a source of light transmitted through a slotted shield while the light sensitive surface is moving to imprint a scale upon the light surface, alternately exposing the light sensitive surface to a second source of light while the light sensitive surface is stationary, and directing the light from said second source to the surface along a path varied in response to variations in the position of the follower, whereby a record of successive profile measurements and the scale by which they are to be measured are imprinted simultaneously in a single continuous operation.

7. In a profile measuring apparatus having means controlling the direction of a ray of light in accordance with the profile of an object, the method of concurrently making a measuring scale for receiving said profile-positioned rays of light comprising, progressing sensitized film across a light transmitting slit, successively directing separated rays of light through the slit onto the film while the film is moving to make spaced elongated indications on the film in registration with said profile positioned rays of light, and periodically during such series of successive illuminations of the film intensifying the separated rays of light to cause the formation of heavier indications on the film.

8. In a system of making and recording profile measurements the combination of a slide provided with means for holding an article to be measured, a motor for advancing the slide, an energizing circuit for the motor, a motor switch for connecting the energizing circuit to the motor, a feeler to engage the article, a movable mirror operatively connected wtih the feeler, a housing adapted to contain a sensitized film, said housing having an exposure slit, a source of illumination providing a ray of light adapted to be directed by the mirror through the slit onto the film to indicate the feeler position, an energizing circuit for said source, a source switch for connecting the source to its circuit, a second source of illumination adapted to direct light through said slit, another energizing circuit for the second source, another source switch for connecting said second source to its circuit, a grid having a row of spaced openings interposed between the second source and the film to form spaced scale indications thereon, a second motor, a mechanism operated thereby to progress the film periodically, a cam mechanism driven by said motor and operably engaging each of said switches in predetermined relation to successively energize the slide motor to move the article, then to energize the second source to make a scale indication and then to disconnect the slide motor and second source from their energizing circuits and energize the first source to indicate the feeler position, and a limit switch controlled by the article advancing motor for preventing its advancement beyond a predetermined article limit.

9. In an apparatus for measuring cross sectional distances of an object, the combination of a pair of arms side by side, independent pivots for said arms at one end, feelers projecting toward each other and from the arms adjacent their other ends, an inwardly projecting rack on each arm, abutment screws carried by the respective racks and adapted to engage each other to limit the approach of the free ends of the arms, a pair of pinions meshing with the respective racks, a mirror carried by each pinion for reflecting light from a source toward a receiving and indicating medium, and tension means on each of the arms for urging their respective pinions in a direction to absorb the backlash between the pinions and the corresponding racks.

10. In a measuring apparatus, the combination of a movable slide, means for holding thereon an article to be measured, a feeler adapted to engage a face of the article, a mirror movable by the feeler, means for holding a sensitized film in position to receive a ray of light adapted to be directed by the mirror to produce visual indications of the feeler position, a lamp, a grid between the lamp and the film, means for directing light from the lamp through the grid and in spaced regions on the film to produce spaced marks forming a quantitative measuring scale in registration with said feeler indications, a switch mechanism to illuminate the scale lamp, means to advance the film while the scale lamp is illuminated, a resistance in the circuit to the scale lamp and means for periodically short circuiting the resistance to increase the illumination of the light to make heavier marks on the film.

11. An apparatus for producing a chart indicative of measurement of an object comprising, a housing adapted to contain a sensitized film, mechanism for intermittently progressing the film across the slit in the housing, a stationary grid in front of the housing, means for directing light through the grid and through the slit to act on the film when the film is moving, feeler mechanism to engage the object and be moved thereby, a mirror, means for directing light towards the mirror, means coacting between the mirror and feeler mechanism to cause the mirror to be turned by the feeler mechanism and thereby reflect light through the slit onto the film at a time when it is stationary, and means for alternately interrupting the light through the grid and the light reflected by the mirror.

12. An apparatus for producing a chart indicative of measurement of an object comprising, means for holding and intermittently progressing a sensitized film, a stationary grid, means for directing light through the grid onto the film at a time when the film is moving, feeler mechanism for engaging the object and adapted to be moved thereby for measurement, a mirror, means for directing light towards the mirror, means coacting between the mirror and feeler mechanism to cause the mirror to be turned by the feeler mechanism and thereby reflect light onto the same region of the film, means operative during measurement of the article for alternately controlling each of said light directing means so that illumination through the grid occurs at one time and illumination reflected by the mirror occurs at another time.

13. The combination of means for holding an object to be measured, a pair of pivot arms, inwardly projecting feelers carried by the respective arms to engage opposite faces of the object to be measured, a pair of independently pivoted mirrors, intermediate mechanism connecting each mirror respectively for movement with one of the arms, and a pair of mutually overlapping magnets have adjacent opposite poles and each carried respectively by one of the arms for mutual magnetic coaction, thereby urging the feelers to approach each other.

References Cited in the file of this patent

UNITED STATES PATENTS

| | | |
|---|---|---|
| 865,418 | Moe | Sept. 10, 1907 |
| 1,157,796 | Morehouse | Oct. 26, 1915 |
| 1,504,271 | Rorison | Aug. 12, 1924 |
| 1,603,340 | Hubbell | Oct. 19, 1926 |
| 1,655,386 | Craig | Jan. 3, 1928 |
| 1,836,365 | Drake | Dec. 15, 1931 |
| 1,943,862 | Godfrey | Jan. 16, 1934 |
| 1,976,337 | Firestone | Oct. 9, 1934 |
| 2,206,054 | Scase | July 2, 1940 |
| 2,248,973 | Eby | July 15, 1941 |
| 2,261,093 | Poupitch | Oct. 28, 1941 |
| 2,293,349 | Martin | Aug. 18, 1942 |
| 2,316,550 | Bigalke | Apr. 13, 1943 |
| 2,348,401 | Manzanera | May 9, 1944 |
| 2,347,345 | Wallace | Apr. 25, 1944 |
| 2,369,425 | Becker | Feb. 13, 1945 |
| 2,449,093 | Weingarten | Sept. 14, 1948 |
| 2,482,051 | Yingling | Sept. 13, 1949 |
| 2,501,538 | Ruska | Mar. 21, 1950 |
| 2,551,597 | Hall | May 8, 1951 |

FOREIGN PATENTS

| | | |
|---|---|---|
| 705,063 | Germany | Apr. 16, 1941 |
| 865,954 | France | June 11, 1941 |
| 165,935 | Great Britain | July 1, 1921 |

OTHER REFERENCES

Iron Age, pages 40 and 41, January 16, 1947.